US012394927B2

(12) United States Patent
Yao et al.

(10) Patent No.: US 12,394,927 B2
(45) Date of Patent: Aug. 19, 2025

(54) ELECTRICAL CONNECTOR WITH IMPROVED SIGNAL TRANSMISSION QUALITY AND MANUFACTURING METHOD THEREOF

(71) Applicant: LUXSHARE TECHNOLOGIES INTERNATIONAL, INC., Milpitas, CA (US)

(72) Inventors: Kunlin Yao, Dongguan (CN); Rongzhe Guo, Dongguan (CN)

(73) Assignee: LUXSHARE TECHNOLOGIES INTERNATIONAL, INC., Milpitas, CA (US)

( * ) Notice: Subject to any disclaimer, the term of this patent is extended or adjusted under 35 U.S.C. 154(b) by 327 days.

(21) Appl. No.: 18/106,145

(22) Filed: Feb. 6, 2023

(65) Prior Publication Data

US 2024/0222892 A1 Jul. 4, 2024

(30) Foreign Application Priority Data

Dec. 29, 2022 (CN) ........................ 202211710170.X

(51) Int. Cl.
*H01R 12/75* (2011.01)
*H01R 12/51* (2011.01)
(Continued)

(52) U.S. Cl.
CPC ........... *H01R 12/75* (2013.01); *H01R 12/515* (2013.01); *H01R 12/7064* (2013.01);
(Continued)

(58) Field of Classification Search
CPC .. H01R 12/75; H01R 12/515; H01R 12/7064; H01R 12/714; H01R 13/6471;
(Continued)

(56) References Cited

U.S. PATENT DOCUMENTS

2014/0004744 A1 1/2014 Hsu et al.
2014/0302694 A1* 10/2014 Qiao .................. H01R 13/6275 439/352
(Continued)

FOREIGN PATENT DOCUMENTS

CN 203423280 U 2/2014
CN 114122832 A 3/2022
(Continued)

OTHER PUBLICATIONS

Machine Translation TW I574467 B, (dated Mar. 11, 2017) (Year: 2025).*

*Primary Examiner* — Travis S Chambers
(74) *Attorney, Agent, or Firm* — Birch, Stewart, Kolasch & Birch, LLP

(57) ABSTRACT

An electrical connector includes a first terminal group, a first ground piece, a second terminal group, a second ground piece and an insulating body. The first terminal group includes a number of first signal terminals and a number of first ground terminals. The first ground piece connects all the first ground terminals in series. The second terminal group includes a number of second signal terminals and a number of second ground terminals. The second ground piece connects all the second ground terminals in series. The insulating body includes a tongue plate. The first ground piece and the second ground piece are located between the first terminal group and the second terminal group along a thickness direction of the tongue plate. As a result, the mutual interference during signal transmission is reduced and the quality of signal transmission is improved. A method of manufacturing the electrical connector is also disclosed.

18 Claims, 15 Drawing Sheets

(51) Int. Cl.
*H01R 12/70* (2011.01)
*H01R 12/71* (2011.01)
*H01R 13/6471* (2011.01)
*H01R 13/516* (2006.01)

(52) U.S. Cl.
CPC ....... *H01R 12/714* (2013.01); *H01R 13/6471* (2013.01); *H01R 13/516* (2013.01)

(58) Field of Classification Search
CPC .... H01R 13/516; H01R 4/023; H01R 12/592; H01R 12/62; H01R 13/405; H01R 13/6586; H01R 13/652; H01R 13/502; H01R 13/646; H01R 13/6585
See application file for complete search history.

(56) References Cited

U.S. PATENT DOCUMENTS

| | | | | |
|---|---|---|---|---|
| 2021/0313726 A1* | 10/2021 | Huang | ................. | H01R 13/514 |
| 2022/0077632 A1* | 3/2022 | Chen | .................. | H01R 13/6581 |
| 2022/0231464 A1* | 7/2022 | Chen | .................... | H01R 12/727 |
| 2023/0058246 A1* | 2/2023 | Liong | .................... | H01R 13/10 |
| 2023/0063499 A1* | 3/2023 | Huang | ................. | H01R 13/516 |
| 2023/0216248 A1* | 7/2023 | Huang | ............... | H01R 12/7005 439/108 |
| 2024/0364057 A1* | 10/2024 | Zhu | .................... | H01R 13/6471 |

FOREIGN PATENT DOCUMENTS

| | | | | |
|---|---|---|---|---|
| CN | 113314869 | B | | 6/2022 |
| TW | I574467 | B | * | 3/2017 |
| TW | M583144 | U | | 9/2019 |
| TW | 202133495 | A | | 9/2021 |

* cited by examiner

ELECTRICAL CONNECTOR WITH IMPROVED SIGNAL TRANSMISSION QUALITY AND MANUFACTURING METHOD THEREOF

CROSS-REFERENCE TO RELATED APPLICATION

This patent application claims priority of a Chinese Patent Application No. 202211710170. X, filed on Dec. 29, 2022 and titled "ELECTRICAL CONNECTOR AND MANUFACTURING METHOD THEREOF", the entire content of which is incorporated herein by reference.

TECHNICAL FIELD

The present disclosure relates to an electrical connector and a manufacturing method thereof, which belongs to a technical field of connectors.

BACKGROUND

In order to facilitate layout, some electrical connectors in the related art use a daughter circuit board as a tongue plate of the electrical connector. According to different application conditions, the relevant electrical connector is also provided with a plurality of cables or conductive terminals connected to the daughter circuit board.

With the continuous improvement of the signal transmission requirements of the electrical connector, the transmission speed of the signals in the daughter circuit board is low and distortion is easily generated.

Therefore, it is necessary to improve the electrical connector in the related art.

SUMMARY

An object of the present disclosure is to provide an electrical connector with improved structure for improving high signal transmission quality, and a manufacturing method of the electrical connector.

In order to achieve the above object, the present disclosure adopts the following technical solution: an electrical connector, including: a first terminal group including a plurality of first conductive terminals, the plurality of first conductive terminals including a plurality of first signal terminals and a plurality of first ground terminals, each first conductive terminal including a flat first mating portion; a first ground piece including a plurality of first abutting portions and a plurality of first protruding portions connected to the first abutting portions; wherein the first signal terminal is not in contact with a corresponding first protruding portion; the first abutting portions are in contact with corresponding first ground terminals to connect all the first ground terminals in series; a second terminal group including a plurality of second conductive terminals, the plurality of second conductive terminals including a plurality of second signal terminals and a plurality of second ground terminals, each second conductive terminal including a flat second mating portion; a second ground piece including a plurality of second abutting portions and a plurality of second protruding portions connected to the second abutting portions; wherein the second signal terminal is not in contact with a corresponding second protruding portion; the second abutting portions are in contact with corresponding second ground terminals to connect all the second ground terminals in series; and an insulating body including a tongue plate, the tongue plate including a first surface and a second surface opposite to the first surface, the first mating portions of the first conductive terminals being exposed on the first surface, the second mating portions of the second conductive terminals being exposed on the second surface; wherein the first ground piece and the second ground piece are located between the first mating portions and the second mating portions along a thickness direction of the tongue plate.

In order to achieve the above object, the present disclosure adopts the following technical solution: an electrical connector, including: a first terminal group including a plurality of first conductive terminals, the plurality of first conductive terminals including a plurality of first signal terminals and a plurality of first ground terminals, each first conductive terminal including a rigid first mating portion; a first ground piece including a plurality of first abutting portions and a plurality of first protruding portions; wherein the first signal terminals are not in contact with corresponding first protruding portions; the first abutting portions are in contact with corresponding first ground terminals to connect all the first ground terminals in series; a second terminal group including a plurality of second conductive terminals, the plurality of second conductive terminals including a plurality of second signal terminals and a plurality of second ground terminals, each second conductive terminal including a rigid second mating portion; a second ground piece including a plurality of second abutting portions and a plurality of second protruding portions; wherein the second signal terminals are not in contact with corresponding second protruding portions; the second abutting portions are in contact with corresponding second ground terminals to connect all the second ground terminals in series; and an insulating body including a tongue plate configured to be inserted into a slot of a mating connector, the tongue plate including a first surface and a second surface opposite to the first surface, the first mating portions of the first conductive terminals being exposed on the first surface, the second mating portions of the second conductive terminals being exposed on the second surface; wherein the first ground piece and the second ground piece are located between the first mating portions and the second mating portions along a thickness direction of the tongue plate.

In order to achieve the above object, the present disclosure adopts the following technical solution: a method of manufacturing an electrical connector, the electrical connector including: a first terminal group including a plurality of first conductive terminals, the plurality of first conductive terminals including a plurality of first signal terminals and a plurality of first ground terminals, each first conductive terminal including a flat first mating portion; a first ground piece including a plurality of first abutting portions and a plurality of first protruding portions connected to the first abutting portions; wherein the first signal terminal is not in contact with a corresponding first protruding portion; the first abutting portions are in contact with corresponding first ground terminals to connect all the first ground terminals in series; a second terminal group including a plurality of second conductive terminals, the plurality of second conductive terminals including a plurality of second signal terminals and a plurality of second ground terminals, each second conductive terminal including a flat second mating portion; a second ground piece including a plurality of second abutting portions and a plurality of second protruding portions connected to the second abutting portions; wherein the second signal terminal is not in contact with a corresponding second protruding portion; the second abutting portions are in contact with corresponding second ground terminals to connect all the second ground terminals in series; an insulating body including a tongue plate, the tongue plate including a first surface and a second surface opposite to the first surface, the first mating portions of the first conductive terminals being exposed on the first surface, the second mating portions of the second conductive terminals being exposed on the second surface; a first insulating block, the plurality of first conductive terminals and the first ground piece being at least partially insert-molded in the first insulating block; and a second insulating block, the plurality of second conductive terminals and the second ground piece are at least partially insert-molded in the second insulating block; wherein the first ground piece and the second ground piece are located between the first mating portions and the second mating portions along a thickness direction of the tongue plate; the method including: fixing the first ground piece to be in contact with the first ground terminals of the first terminal group to form a first module; injection-molding the first insulating block on the first module to obtain a first terminal module; fixing the second ground piece to be in contact with the second ground terminals of the second terminal group to form a second module; injection-molding the second insulating block on the second module to obtain a second terminal module; and injection-molding an insulating material on the first terminal module and the second terminal module, so that the first terminal module and the second terminal module are combined into a whole.

Compared with the prior art, the present disclosure adopts a method of stacking terminal groups to replace a daughter circuit board in the related art. Using the first conductive terminals and the second conductive terminals to directly transmit signals is beneficial to increase the speed of signal transmission. In addition, by providing the first ground piece and the second ground piece, and setting the first ground piece and the second ground piece along the thickness direction of the tongue plate between the first mating portions and the second mating portions, the mutual interference during signal transmission between the first mating portions of the first conductive terminals and the second mating portions of the second conductive terminals is reduced, thereby improving the quality of signal transmission.

DETAILED DESCRIPTION

Figure 1:
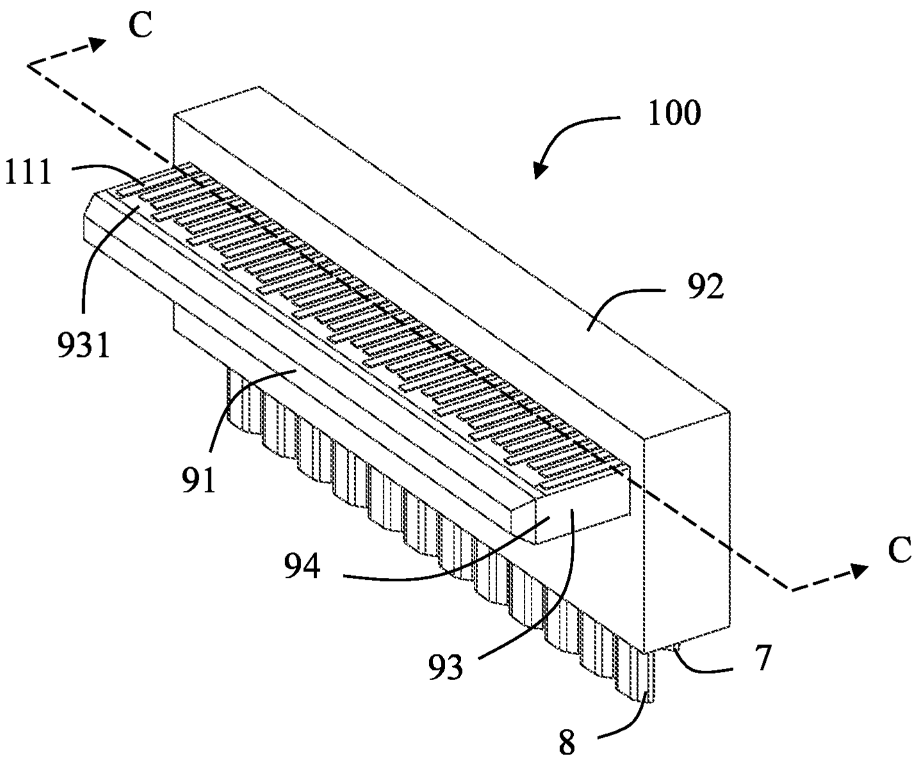
FIG. 1 is a schematic perspective view of an electrical connector in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 15, the present disclosure discloses an electrical connector 100, which includes a first terminal module 10, a second terminal module 20, a plurality of first cables 7 connected to the first terminal module 10, a plurality of second cables 8 connected to the second terminal module 20, a third insulating block 91 injection-molded on the first terminal module 10 and the second terminal module 20, and an outer insulating block 92 injection-molded at junctions of the first cables 7 and the first terminal module 10 and junctions of the second cables 8 and the second terminal module 20.

In the illustrated embodiment of the present disclosure, the electrical connector 100 is a cable connector. Of course, it is understandable to those skilled in the art that in other embodiments, the electrical connector 100 can also be a board-end connector. That is, the electrical connector 100 is configured to be mounted on a circuit board (not shown). At this time, the electrical connector 100 may not have the first cables 7 and the second cables 8.

Figure 6:
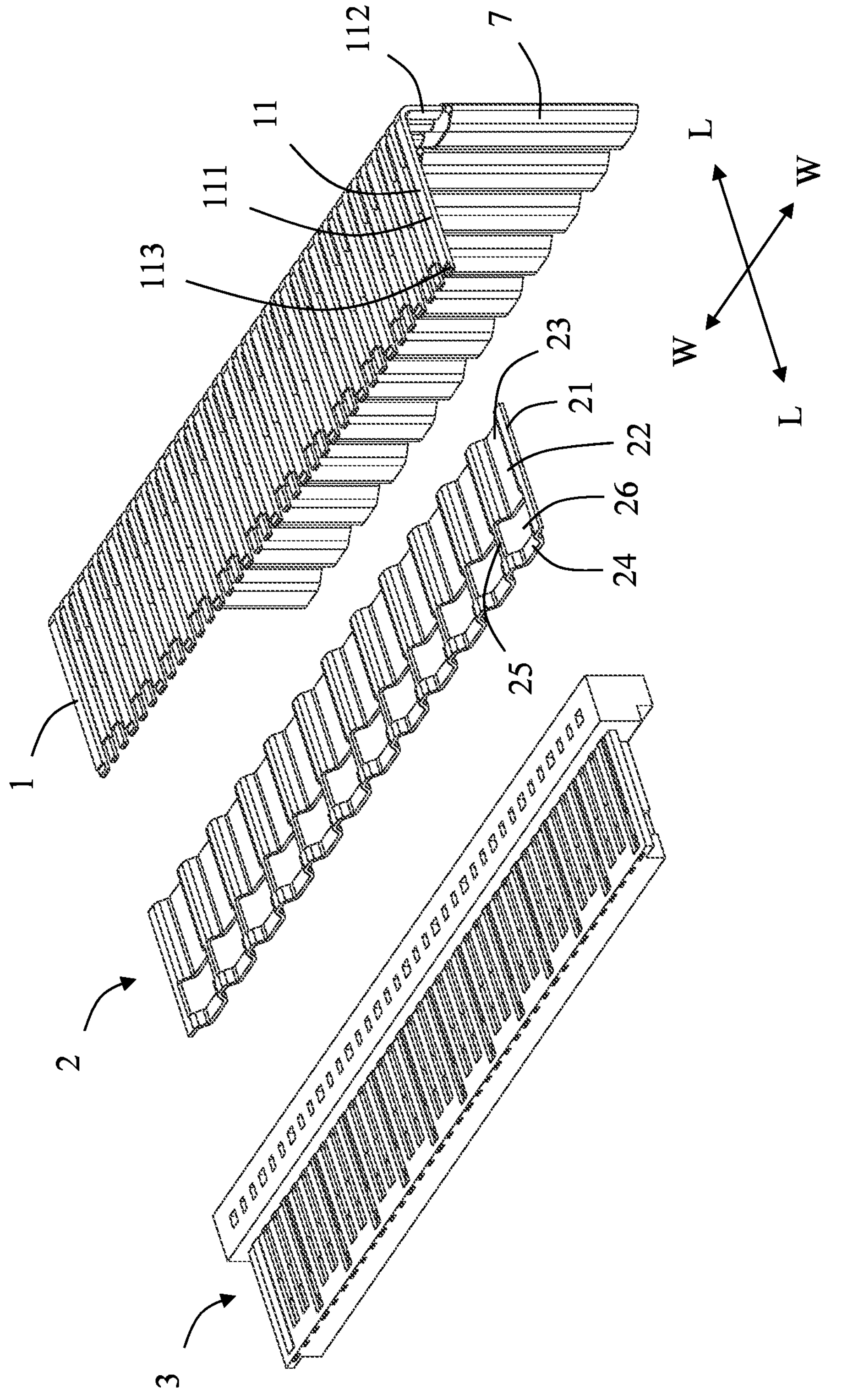
FIG. 6 is a perspective exploded view of the first terminal module in FIG. 5.

Referring to FIG. 6, in the embodiment illustrated in the present disclosure, the first terminal module 10 includes a first terminal group 1, a first ground piece 2 and a first insulating block 3. Wherein, the first insulating block 3 is injection-molded on the first terminal group 1 and the first ground piece 2. In other words, the first terminal group 1 and the first ground piece 2 are at least partially insert-molded in the first insulating block 3.

Figure 7:
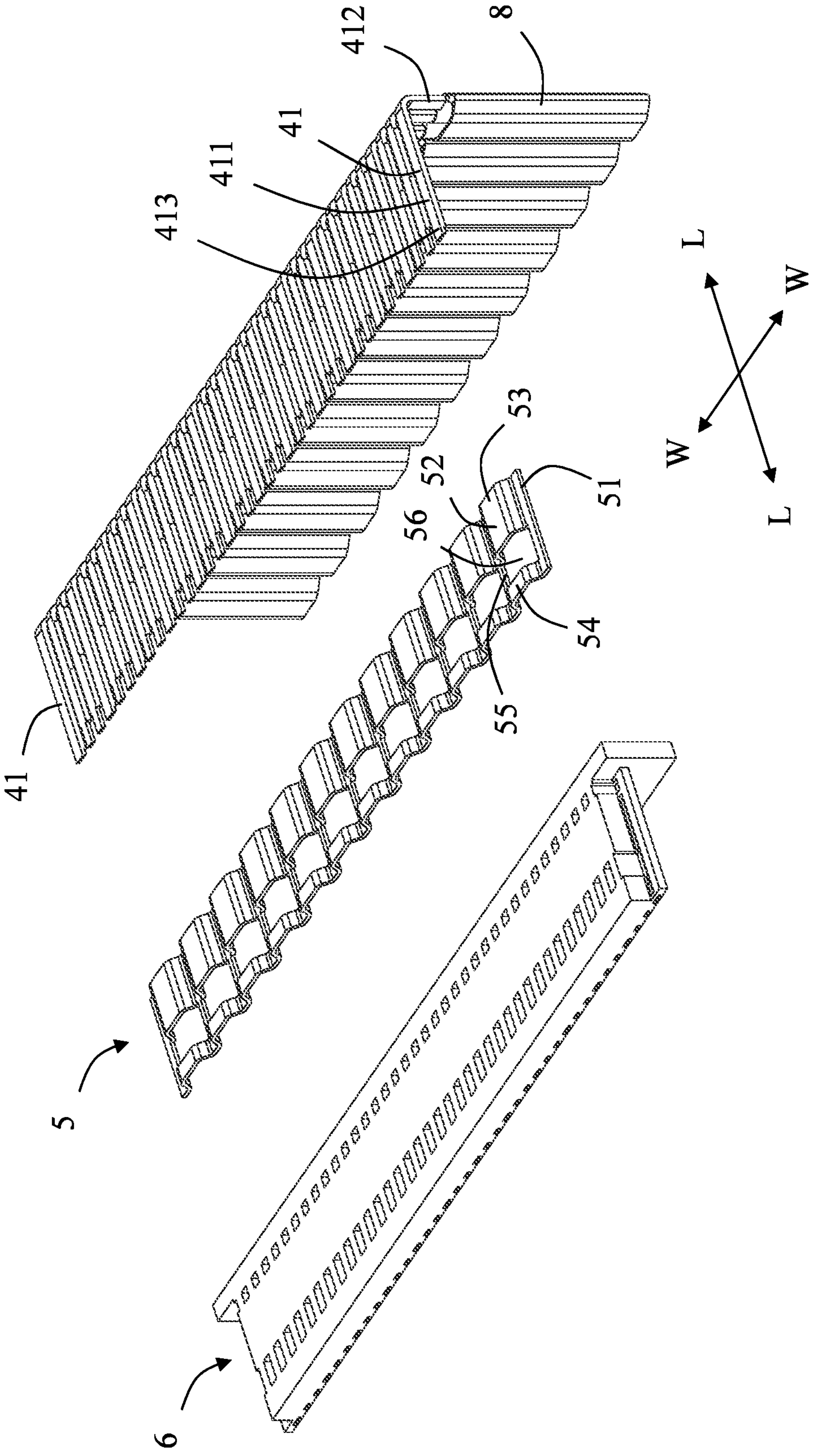
FIG. 7 is a perspective exploded view of the second terminal module in FIG. 6.
Figure 8:
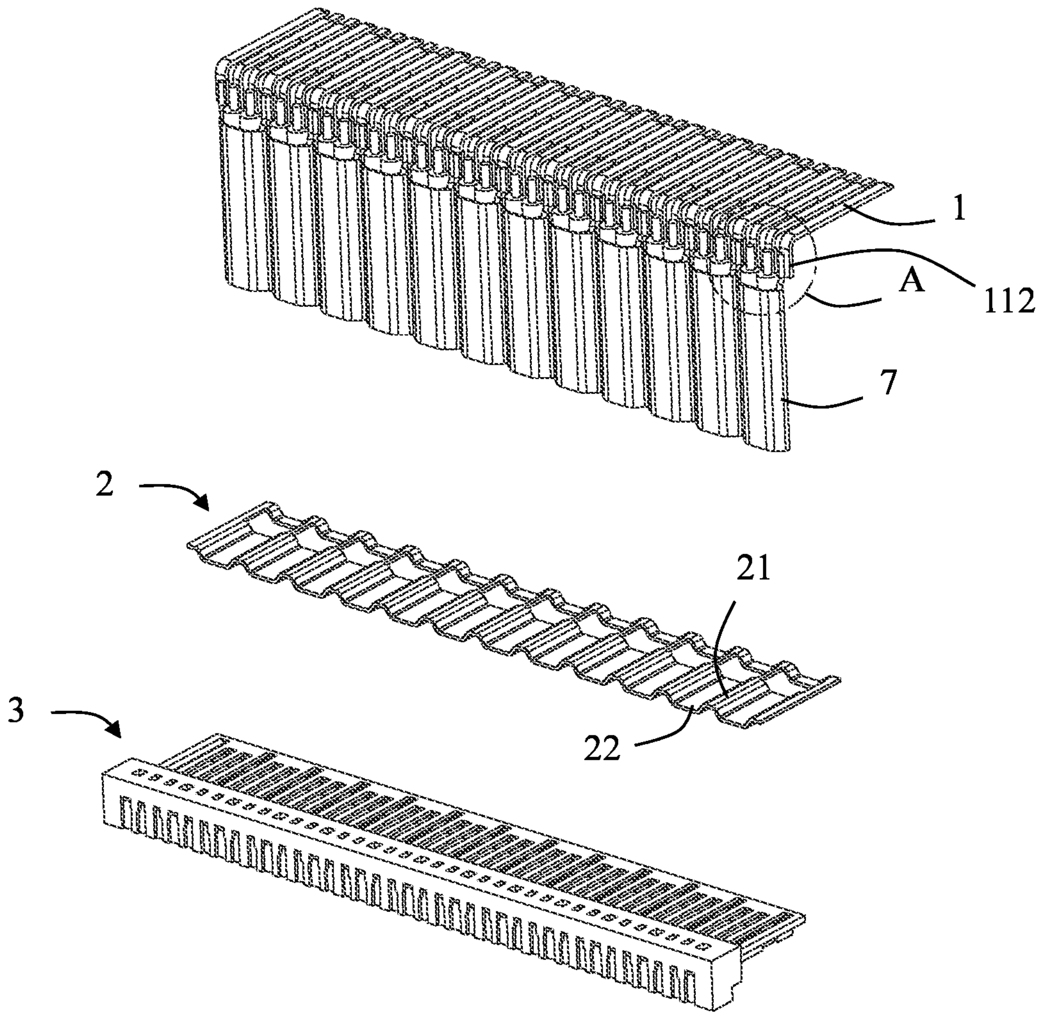
FIG. 8 is a perspective exploded view of the first terminal module from another angle.

Referring to FIG. 7, in the embodiment illustrated in the present disclosure, the second terminal module 20 includes a second terminal group 4, a second ground piece 5 and a second insulating block 6. Wherein, the second insulating block 6 is injection-molded on the second terminal group 4 and the second ground piece 5. In other words, the second terminal group 4 and the second ground piece 5 are at least partially insert-molded in the second insulating block 6.

As shown in FIG. 1, the electrical connector 100 includes a tongue plate 93. The tongue plate 93 is used for being inserted into a slot of a mating connector (not shown). In the illustrated embodiment of the present disclosure, the tongue plate 93 includes the third insulating block 91, the first insulating block 3 and the second insulating block 6.

Referring to FIG. 6, FIG. 8, FIG. 9 and FIG. 15, the first terminal group 1 includes a plurality of first conductive terminals 11. The plurality of first conductive terminals 11 include a plurality of first signal terminals S1 and a plurality of first ground terminals G1. Each first conductive terminal 11 is roughly L-shaped, which includes a flat/rigid first mating portion 111 and a first tail portion 112 bent downwardly from a rear end of the first mating portion 111. In the illustrated embodiment of the present disclosure, the first mating portions 111 are arranged in a row along a width direction W-W of the tongue plate 93. A first thinning portion 113 is provided at an end of the first mating portion 111 to improve the holding force with the first insulating block 3 when it is insert-molded in the first insulating block 3.

In the illustrated embodiment of the present disclosure, the plurality of first signal terminals S1 are divided into a plurality of first signal terminal groups DP1. Each first signal terminal group DP1 includes two adjacent first signal terminals S1. Each side of each first signal terminal group DP1 is associated with one first ground terminal G1. Such setting is beneficial to provide better shielding for the first signal terminal group DP1, thereby improving the quality of signal transmission. Preferably, the first signal terminal group DP1 is a differential pair which is used to transmit differential pair signals.

As shown in FIG. 6, the first ground piece 2 is made of a metal sheet. The first ground piece 2 includes a plurality of first abutting portions 21 and a plurality of first protruding portions 22 connected to the first abutting portions 21. The first abutting portions 21 are in contact with corresponding first ground terminals G1 to connect all the first ground terminals G1 in series, thereby improving the ground shielding effect. The first protruding portions 22 protrude toward the second ground piece 5. The first signal terminals 11 are not in contact with corresponding first protruding portions 22 to prevent short circuit.

Figure 13:
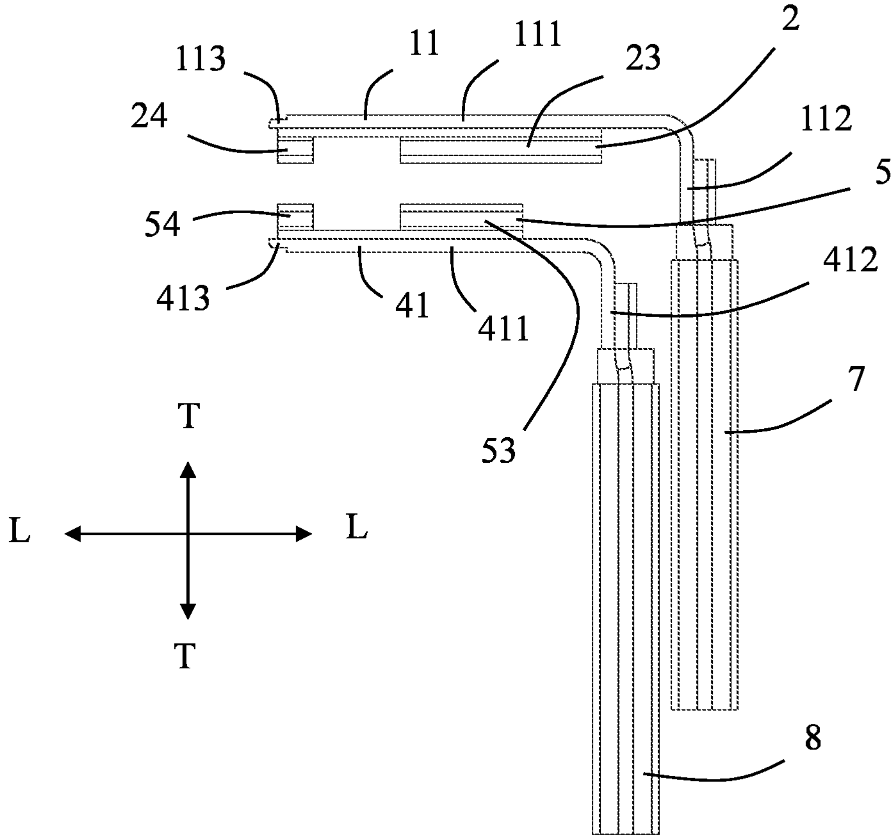
FIG. 13 is a right view of FIG. 12.
Figure 14:
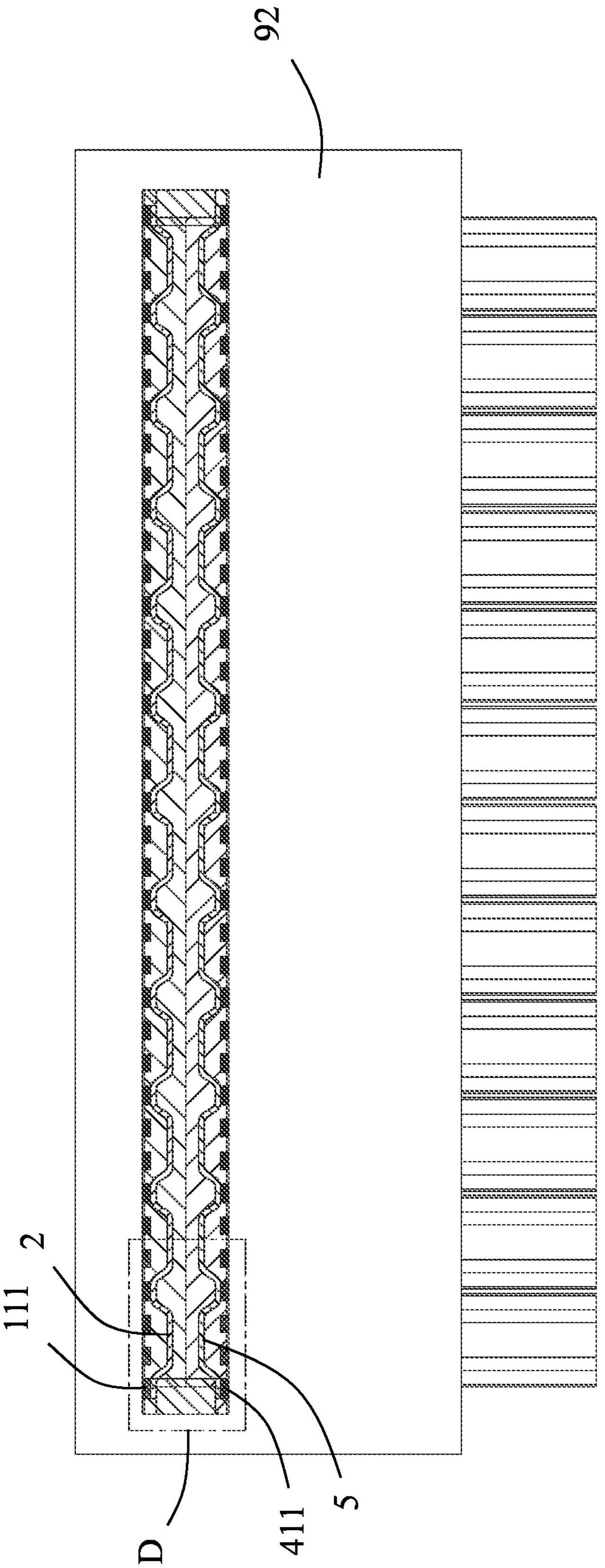
FIG. 14 is a schematic cross-sectional view taken along line C-C in FIG. 1.
Figure 15:
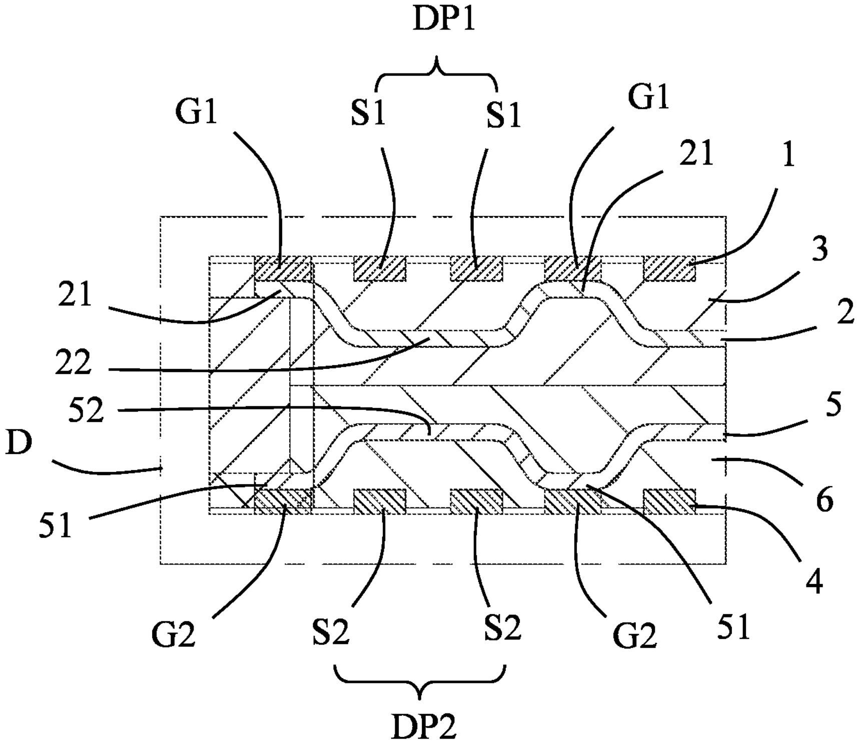
FIG. 15 is a partially enlarged view of a frame portion D in FIG. 14.

Referring to FIG. 13, in the illustrated embodiment of the present disclosure, the first abutting portions 21 are fixed to back surfaces (e.g., lower surfaces) of the first mating portions 111 of the first ground terminals G1 by welding or soldering.

Referring to FIG. 6, in the embodiment shown in the present disclosure, the first ground piece 2 includes a first base portion 23, a first extension portion 24, a plurality of first connection portions 25 connecting the first base portion 23 and the first extension portion 24, and a first opening 26 located between the first base portion 23 and the first extension portion 24. Along a length direction L-L of the tongue plate 93, a length of the first base portion 23 is greater than a length of the first extension portion 24. The first abutting portions 21 are provided on the first base portion 23, the first extension portion 24 and the first connection portions 25. By arranging the first base portion 23 and the first extension portion 24 at intervals along the length direction L-L of the tongue plate 93, it is beneficial to increase the probability that the first ground piece 2 is in contact with the first mating portions 111 of the first ground terminals G1, thereby improving contact reliability.

Figure 9:
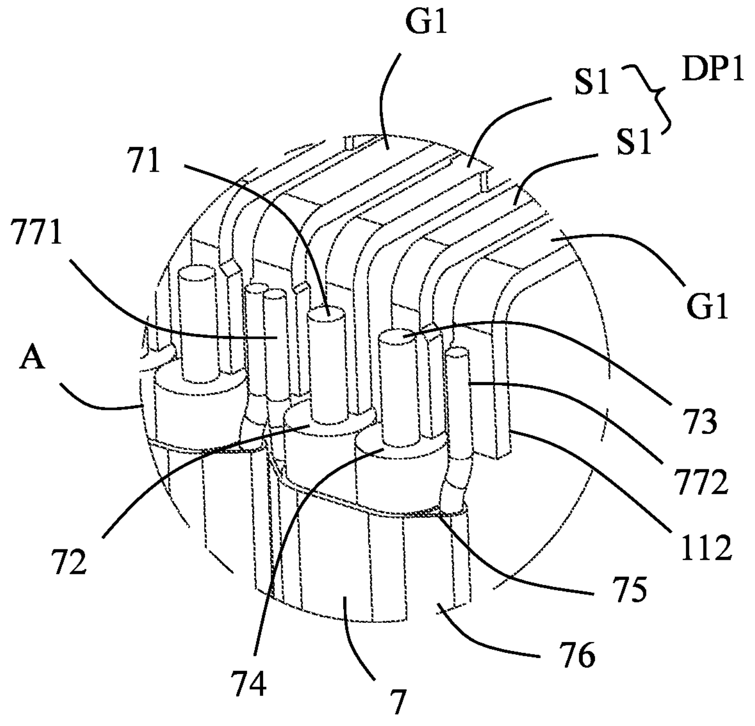
FIG. 9 is a partially enlarged view of a circled portion A in FIG. 8.
Figure 10:
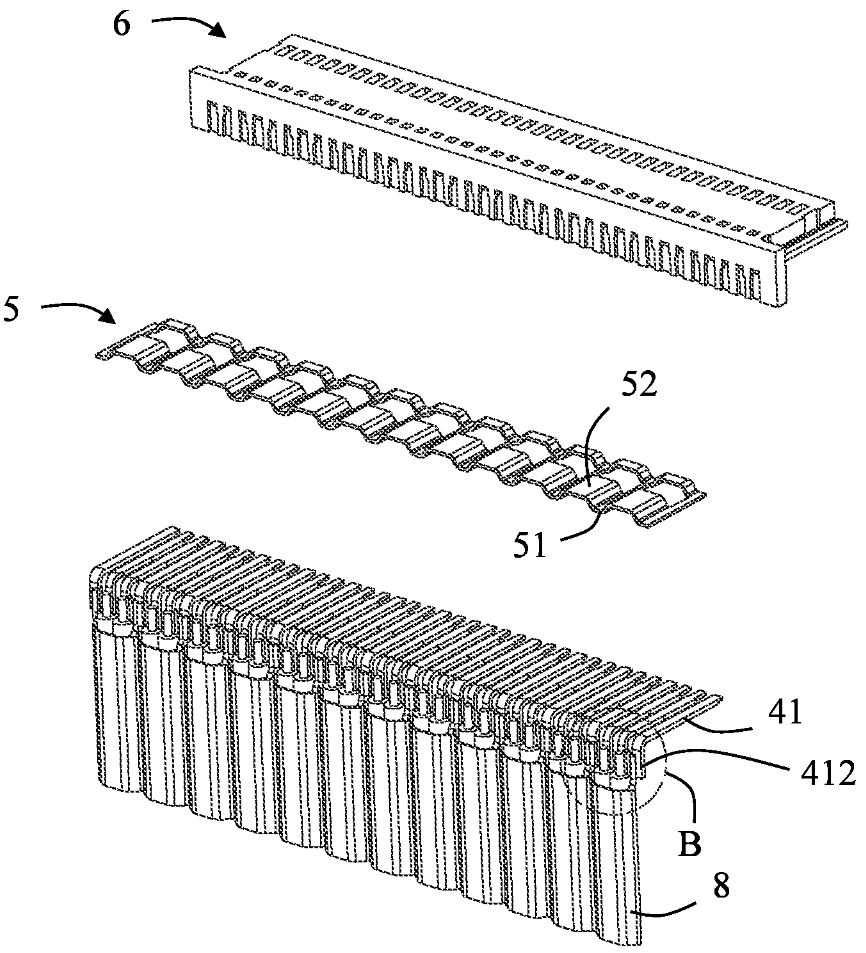
FIG. 10 is a perspective exploded view of the second terminal module from another angle.

Referring to FIG. 9, in the embodiment shown in the present disclosure, the first cables 7 are fixed to the first tail portions 112 of the first conductive terminals 11 by welding or soldering. Each first cable 7 includes a first core 71, a first insulating layer 72 wrapped on the first core 71, a second core 73, a second insulating layer 74 wrapped on the second core 73, a first ground shielding layer 75 wrapped on the first insulating layer 72 and the second insulating layer 74, a first ground cable 771 located on one side of the first ground shielding layer 75, a second ground cable 772 located on the other side of the first ground shielding layer 75, and a first insulating skin 76 wrapped on the first ground shielding layer 75, the first ground cable 771 and the second ground cable 772. The first core 71 and the second core 72 are soldered to the first tail portions 112 of the first signal terminal group DP1 correspondingly. The first ground cable 771 and the second ground cable 772 are soldered to the first ground terminals G1 correspondingly.

Referring to FIG. 7, FIG. 10, FIG. 11 and FIG. 15, the second terminal group 4 includes a plurality of second conductive terminals 41. The plurality of second conductive terminals 41 include a plurality of second signal terminals S2 and a plurality of second ground terminals G2. Each second conductive terminal 41 is roughly L-shaped, which includes a flat/rigid second mating portion 411 and a second tail portion 412 bent downwardly from a rear end of the second mating portion 411. In the illustrated embodiment of the present disclosure, the second mating portions 411 are arranged in a row along the width direction W-W of the tongue plate 93. A second thinning portion 413 is provided at an end of the second mating portion 411 to improve the holding force with the second insulating block 6 when it is insert-molded in the second insulating block 6. The first mating portions 111 and the second mating portions 411 are used for contacting with conductive terminals (not shown) of the mating connector.

In the illustrated embodiment of the present disclosure, the plurality of second signal terminals S2 are divided into a plurality of second signal terminal groups DP2. Each second signal terminal group DP2 includes two adjacent second signal terminals S2. Each side of each second signal terminal group DP2 is associated with one second ground terminal G2. Such setting is beneficial to provide better shielding for the second signal terminal group DP2, thereby improving the quality of signal transmission. Preferably, the second signal terminal group DP2 is a differential pair which is used to transmit differential pair signals.

The second ground piece 5 is made of a metal sheet. The second ground piece 5 includes a plurality of second abutting portions 51 and a plurality of second protruding portions 52 connected to the second abutting portions 51. The second abutting portions 51 are in contact with the corresponding second ground terminals G2 to connect all the second ground terminals G2 in series, thereby improving the ground shielding effect. The second protruding portions 52 protrudes toward the first ground piece 2. The second signal terminals S2 are not in contact with the corresponding second protruding portions 52 to prevent a short circuit.

In the embodiment shown in the present disclosure, the second abutting portions 51 are fixed to back surfaces (e.g., upper surfaces) of the second mating portions 411 of the second ground terminals G2 by welding or soldering.

Referring to FIG. 7, in the embodiment illustrated in the present disclosure, the second ground piece 5 includes a second base portion 53, a second extension portion 54, a plurality of second connection portions 55 connecting the second base portion 53 and the second extension portion 54, and a second opening 56 located between the second base portion 53 and the second extension portion 54. Along the length direction L-L of the tongue plate 93, a length of the second base portion 53 is greater than a length of the second extension portion 54. The second abutting portions 51 are provided on the second base portion 53, the second extension portion 54 and the second connection portions 55. By arranging the second base portion 53 and the second extension portion 54 at intervals along the length direction L-L of the tongue plate 93, it is beneficial to increase the probability that the second ground piece 5 contacts with the second mating portions 411 of the second ground terminals G2, thereby improving contact reliability.

Figure 11:
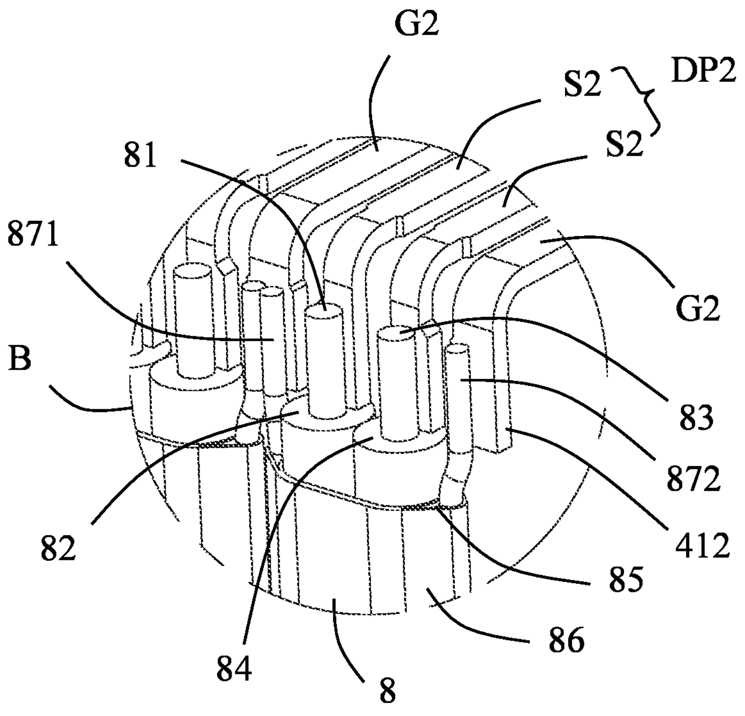
FIG. 11 is a partially enlarged view of a circled portion B in FIG. 10.
Figure 12:
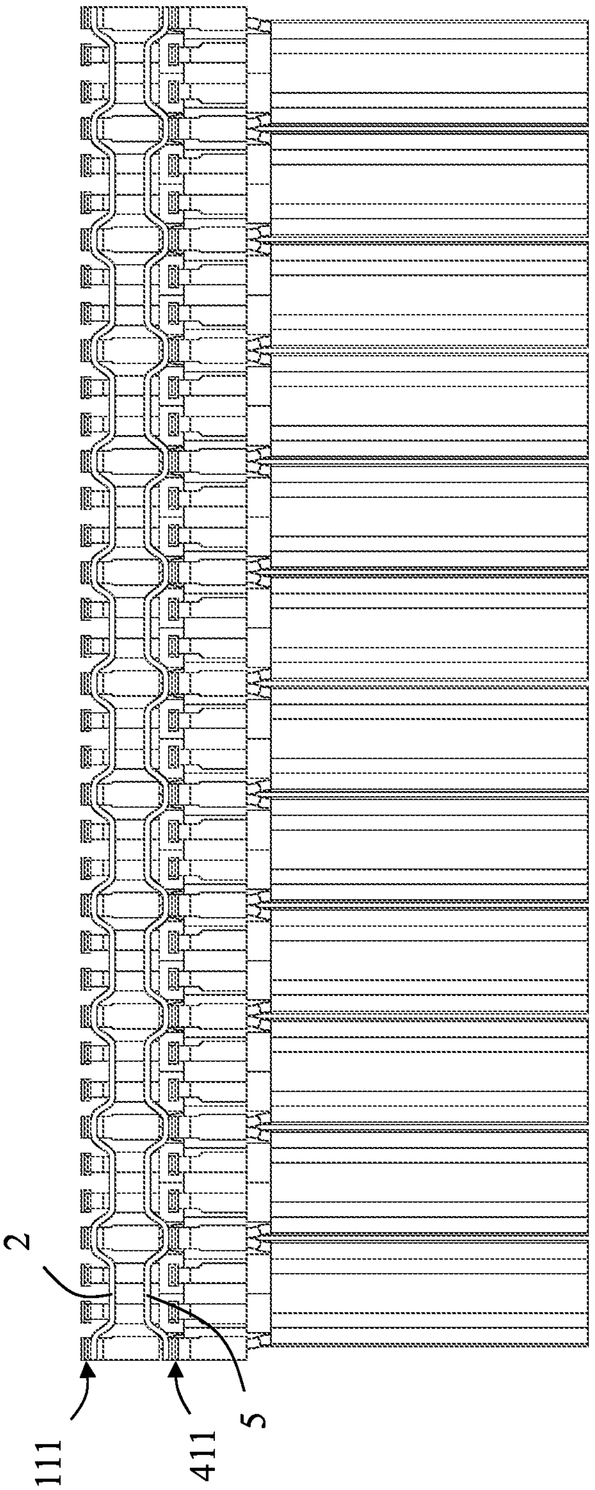
FIG. 12 is a front view of first conductive terminals, second conductive terminals, first cables and second cables in FIG. 4.

Referring to FIG. 11, in the embodiment shown in the present disclosure, the second cables 8 are fixed to the second tail portions 412 of the second conductive terminals 41 by welding or soldering. Each second cable 8 includes a third core 81, a third insulating layer 82 wrapped on the third core 81, a fourth core 83, a fourth insulating layer 84 wrapped on the fourth core 83, a second ground shielding layer 85 wrapped on the third insulating layer 82 and the fourth insulating layer 84, a third ground cable 871 located on one side of the second ground shielding layer 85, a fourth ground cable 872 located on the other side of the second ground shielding layer 85, and a second insulating skin 86 wrapped on the second ground shielding layer 85, the third ground cable 871 and the fourth ground cable 872. The third core 81 and the fourth core 82 are soldered to the second tail portions 412 of the second signal terminal group DP2 correspondingly. The third ground cable 871 and the fourth ground cable 872 are soldered to the second ground terminals G2 correspondingly.

Figure 2:
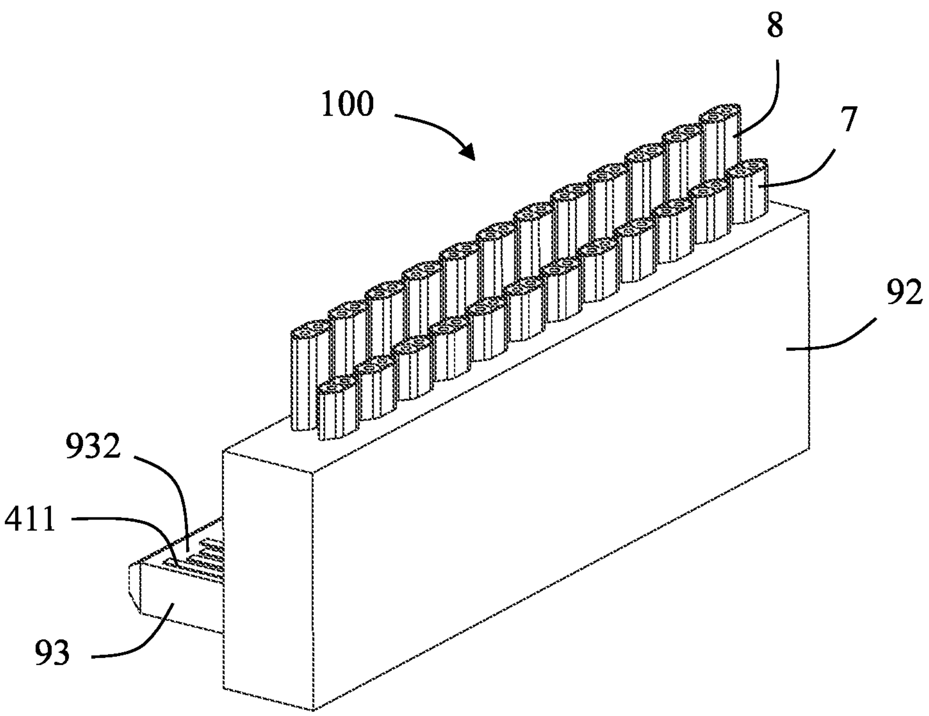
FIG. 2 is a schematic perspective view of FIG. 1 from another angle.
Figure 3:
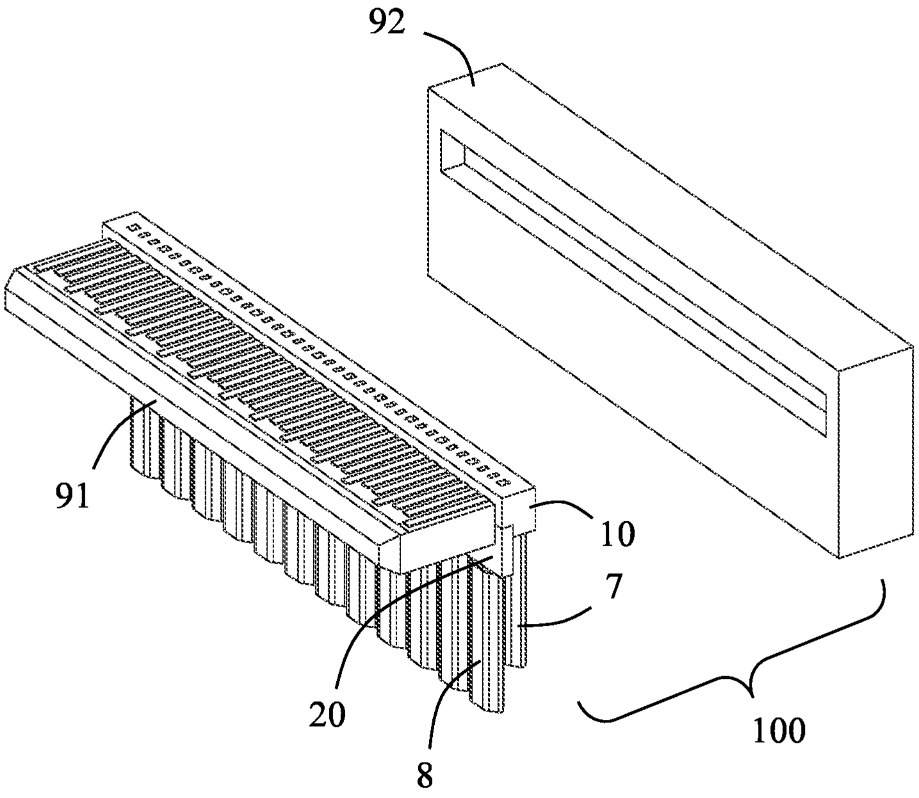
FIG. 3 is a partial perspective exploded view of FIG. 1, wherein an outer insulating block is separated.
Figure 4:
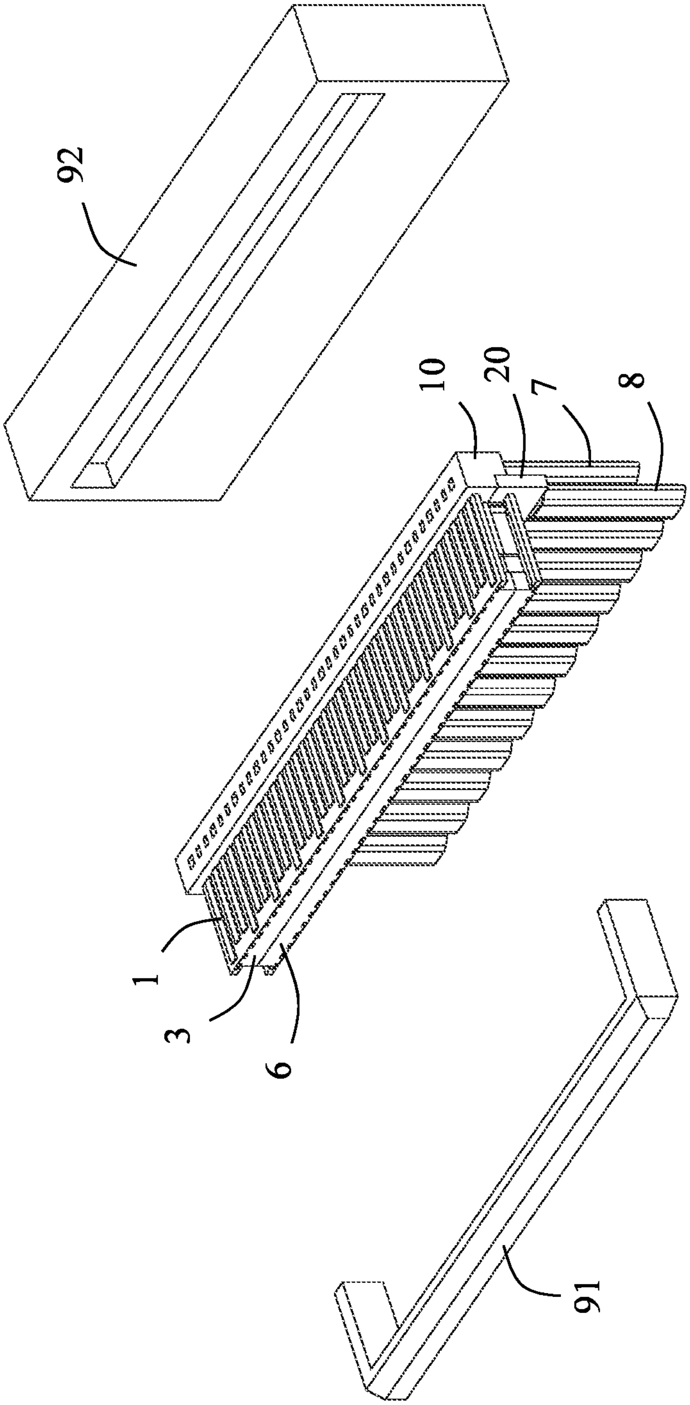
FIG. 4 is a further partial perspective exploded view of FIG. 3, wherein a third insulating block is also separated.
Figure 5:
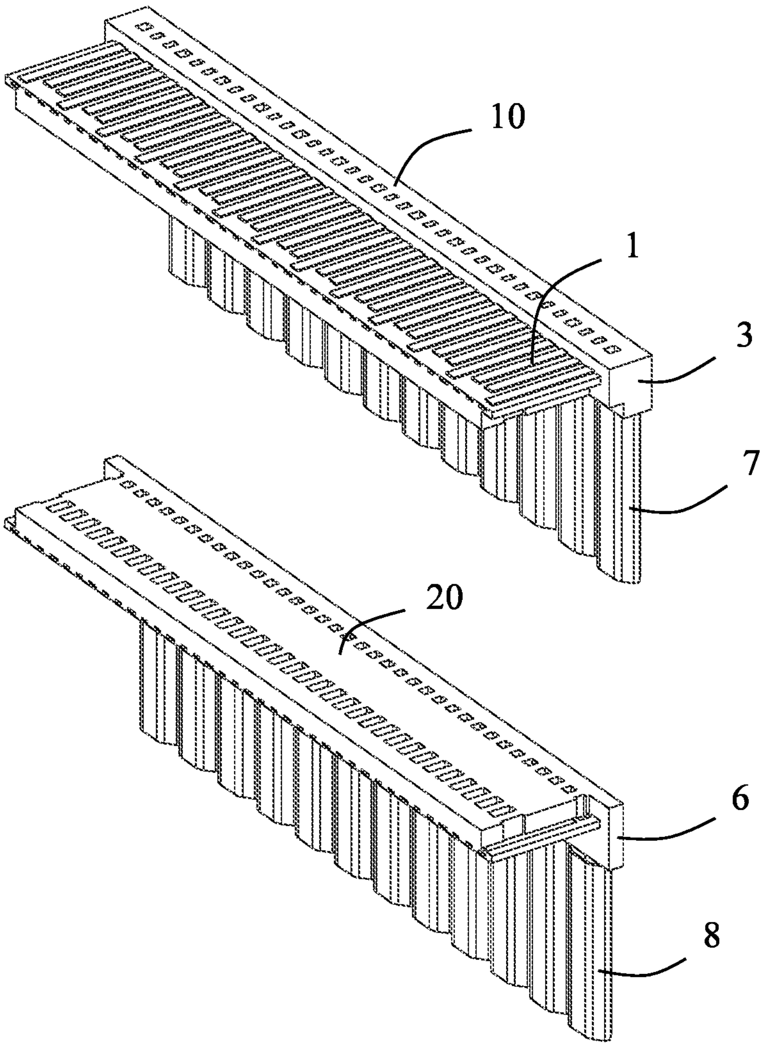
FIG. 5 is a perspective exploded view when a first terminal module and a second terminal module in FIG. 4 are separated from each other.

Referring to FIG. 1 and FIG. 2, the tongue plate 93 includes a first surface 931 and a second surface 932 opposite to the first surface 931. The first mating portions 111 are exposed on the first surface 931. The second mating portions 411 are exposed on the second surface 932.

Referring to FIG. 6, FIG. 7 and FIG. 13, the first ground piece 2 and the second ground piece 5 are located between the first mating portions 111 and the second mating portions 411 along the thickness direction T-T of the tongue plate 93. The length direction L-L of the tongue plate 93, the thickness direction T-T of the tongue plate 93 and the width direction W-W of the tongue plate 93 are perpendicular to one another.

In the illustrated embodiment of the present disclosure, the third insulating block 91 is integrally formed with the first insulating block 3 and the second insulating block 6 by injection-molding. Before injection-molding, the first insulating block 3 and the second insulating block 6 are abutted against each other to ensure the mutual positional relationship between the first conductive terminals 11 and the second conductive terminals 41.

In the illustrated embodiment of the present disclosure, the outer insulating block 92 is integrally formed with the first insulating block 3 and the second insulating block 6 by injection-molding.

The electrical connector 100 includes an insulating body 94. In the illustrated embodiment of the present disclosure, the insulating body 94 includes the tongue plate 93 and the outer insulating block 92.

It is understandable to those skilled in the art that in other embodiments of the present disclosure, the structures of the first insulating block 3, the second insulating block 6 and the third insulating block 91 can also be flexibly adjusted. For example, the first insulating block 3 and the second insulating block 6 can also be fixed with the third insulating block 91 by assembling.

In other embodiments of the present disclosure, the outer insulating block 92 and the third insulating block 91 may also be injection-molded on the first terminal module 10 and the second terminal module 20 at the same time.

The present disclosure also discloses a method of manufacturing the illustrated electrical connector 100, which includes:

- fixing the first ground piece 2 to the first ground terminals G1 of the first terminal group 1 by welding or soldering to form a first module;
- injection-molding the first insulating block 3 on the first module to obtain a first terminal module 10;
- fixing the second ground piece 5 to the second ground terminals G2 of the second terminal group 4 by welding or soldering to form a second module;
- injection-molding the second insulating block 6 on the second module to obtain a second terminal module 20;
- injection-molding an insulating material on the first terminal module 10 and the second terminal module 20 to combine the first terminal module 10 and the second terminal module 20 into a whole.

In the illustrated embodiment of the present disclosure, the manufacturing method further includes:

- providing a plurality of first cables 7 and a plurality of second cables 8; connecting the first cables 7 and the second cables 8 to the corresponding first conductive terminals 11 and the second conductive terminals 41, respectively; and
- injection-molding an insulating material at junctions of the first cables 7 and the first conductive terminals 11 and at junctions between the second cables 8 and the second conductive terminals 41 to form an outer insulating block 92. The outer insulating block 92 is integrally formed with the first insulating block 3 and the second insulating block 6.

For other steps of the manufacturing method of the present disclosure, reference may be made to the description of the structure of the electrical connector 100, which will not be repeated in the present disclosure.

Compared with the prior art, the present disclosure replaces a daughter circuit board in the related art by stacking terminal groups, and uses the first conductive terminal 11 and the second conductive terminal 41 to directly transmit signals, which is beneficial to improve signal transmission speed. In addition, by providing the first ground piece 2 and the second ground piece 5, and setting the first ground piece 2 and the second ground piece 5 along the thickness direction T-T of the tongue plate 93 between the first mating portions 111 and the second mating portions 411, the mutual interference during signal transmission between the first mating portions 111 of the first conductive terminals 11 and the second mating portions 411 of the second conductive terminals 41 is reduced, thereby improving the quality of signal transmission.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

a first terminal group comprising a plurality of first conductive terminals, the plurality of first conductive terminals comprising a plurality of first signal terminals and a plurality of first ground terminals, each first conductive terminal comprising a flat first mating portion;

a first ground piece comprising a plurality of first abutting portions and a plurality of first protruding portions connected to the first abutting portions; wherein the first signal terminal is not in contact with a corresponding first protruding portion; the first abutting portions are in contact with corresponding first ground terminals to connect all the first ground terminals in series;

a second terminal group comprising a plurality of second conductive terminals, the plurality of second conductive terminals comprising a plurality of second signal terminals and a plurality of second ground terminals, each second conductive terminal comprising a flat second mating portion;

a second ground piece comprising a plurality of second abutting portions and a plurality of second protruding portions connected to the second abutting portions; wherein the second signal terminal is not in contact with a corresponding second protruding portion; the second abutting portions are in contact with corresponding second ground terminals to connect all the second ground terminals in series; and an insulating body comprising a tongue plate, the tongue plate comprising a first surface and a second surface opposite to the first surface, the first mating portions of the first conductive terminals being exposed on the first surface, the second mating portions of the second conductive terminals being exposed on the second surface;

wherein the first ground piece and the second ground piece are located between the first mating portions and the second mating portions along a thickness direction of the tongue plate; and wherein the plurality of first signal terminals are divided into a plurality of first signal terminal groups, each first signal terminal group comprises two adjacent first signal terminals, each side of each first signal terminal group is associated with one first ground terminal, and the first abutting portions are fixed to the corresponding first ground terminals by welding or soldering.

2. The electrical connector according to claim 1, wherein the plurality of second signal terminals are divided into a plurality of second signal terminal groups, each second signal terminal group comprises two adjacent second signal terminals, each side of each second signal terminal group is associated with one second ground terminal, and the second abutting portions are fixed to the corresponding second ground terminals by welding or soldering.

3. The electrical connector according to claim 2, wherein the first abutting portions are fixed to back surfaces of the first mating portions of the first ground terminals by welding or soldering; and wherein the second abutting portions are fixed to back surfaces of the second contact portions of the second ground terminals by welding or soldering.

4. The electrical connector according to claim 1, wherein the first mating portions are arranged in a row along a width direction of the tongue plate; the second mating portions are arranged in a row along the width direction; and the width direction of the tongue plate is perpendicular to the thickness direction of the tongue plate.

5. The electrical connector according to claim 1, wherein the first protruding portions protrude toward the second ground piece; and the second protruding portions protrude toward the first ground piece.

6. The electrical connector according to claim 1, wherein the first ground piece comprises a first base portion, a first extension portion, a plurality of first connection portions connecting the first base portion and the first extension portion, and a first opening located between the first base portion and the first extension portion; wherein along a length direction of the tongue plate, a length of the first base portion is greater than a length of the first extension portion; the first abutting portions are provided on the first base portion, the first extension portion and the first connection portions.

7. The electrical connector according to claim 6, wherein the second ground piece comprises a second base portion, a second extension portion, a plurality of second connection portions connecting the second base portion and the second extension portion, and a second opening located between the second base portion and the second extension portion; wherein along the length direction of the tongue plate, a length of the second base portion is greater than a length of the second extension portion; the second abutting portions are provided on the second base portion, the second extension portion and the second connection portions.

8. The electrical connector according to claim 1, further comprising a first insulating block and a second insulating block; wherein the plurality of first conductive terminals and the first ground piece are at least partially insert-molded in the first insulating block; and the plurality of second conductive terminals and the second ground piece are at least partially insert-molded in the second insulating block.

9. The electrical connector according to claim 8, further comprising a third insulating block; wherein the third insulating block is integrally formed with the first insulating block and the second insulating block; the insulating body comprises the first insulating block, the second insulating block and the third insulating block.

10. The electrical connector according to claim 1, further comprising a plurality of first cables and a plurality of second cables; wherein the first cables are connected to corresponding first conductive terminals; and the second cables are connected to corresponding second conductive terminals.

11. An electrical connector, comprising:

a first terminal group comprising a plurality of first conductive terminals, the plurality of first conductive terminals comprising a plurality of first signal terminals and a plurality of first ground terminals, each first conductive terminal comprising a rigid first mating portion;

a first ground piece comprising a plurality of first abutting portions and a plurality of first protruding portions; wherein the first signal terminals are not in contact with corresponding first protruding portions; the first abutting portions are in contact with corresponding first ground terminals to connect all the first ground terminals in series;

a second terminal group comprising a plurality of second conductive terminals, the plurality of second conductive terminals comprising a plurality of second signal terminals and a plurality of second ground terminals, each second conductive terminal comprising a rigid second mating portion;

a second ground piece comprising a plurality of second abutting portions and a plurality of second protruding portions; wherein the second signal terminals are not in contact with corresponding second protruding portions; the second abutting portions are in contact with corresponding second ground terminals to connect all the second ground terminals in series; and an insulating body comprising a tongue plate configured to be inserted into a slot of a mating connector, the tongue plate comprising a first surface and a second surface opposite to the first surface, the first mating portions of the first conductive terminals being exposed on the first surface, the second mating portions of the second conductive terminals being exposed on the second surface;

wherein the first ground piece and the second ground piece are located between the first mating portions and the second mating portions along a thickness direction of the tongue plate; and wherein the first protruding portions protrude toward the second ground piece; and the second protruding portions protrude toward the first ground piece.

12. The electrical connector according to claim 11, wherein the plurality of first signal terminals are divided into a plurality of first signal differential pairs, each first signal differential pair comprises two first signal terminals adjacent to each other, each side of each first signal differential pair is associated with one first ground terminal, and the first abutting portions are fixed to the corresponding first ground terminals by welding or soldering.

13. The electrical connector according to claim 12, wherein the plurality of second signal terminals are divided into a plurality of second signal differential pairs, each second signal differential pair comprises two second signal terminals adjacent to each other, each side of each second signal differential pair is associated with one second ground terminal, and the second abutting portions are fixed to the corresponding second ground terminals by welding or soldering.

14. The electrical connector according to claim 11, wherein the first mating portions are arranged in a row along a width direction of the tongue plate; the second mating portions are arranged in a row along the width direction; and the width direction of the tongue plate is perpendicular to the thickness direction of the tongue plate.

15. The electrical connector according to claim 11, wherein the first ground piece comprises a first base portion, a first extension portion, a plurality of first connection portions connecting the first base portion and the first extension portion, and a first opening located between the first base portion and the first extension portion; wherein along a length direction of the tongue plate, a length of the first base portion is greater than a length of the first extension portion; the first abutting portions are provided on the first base portion, the first extension portion and the first connection portions.

16. The electrical connector according to claim 15, wherein the second ground piece comprises a second base portion, a second extension portion, a plurality of second connection portions connecting the second base portion and the second extension portion, and a second opening located between the second base portion and the second extension portion; wherein along the length direction of the tongue plate, a length of the second base portion is greater than a length of the second extension portion; the second abutting portions are provided on the second base portion, the second extension portion and the second connection portions.

17. A method of manufacturing an electrical connector, the electrical connector comprising:

a first terminal group comprising a plurality of first conductive terminals, the plurality of first conductive terminals comprising a plurality of first signal terminals and a plurality of first ground terminals, each first conductive terminal comprising a flat first mating portion;

a first ground piece comprising a plurality of first abutting portions and a plurality of first protruding portions connected to the first abutting portions; wherein the first signal terminal is not in contact with a corresponding first protruding portion; the first abutting portions are in contact with corresponding first ground terminals to connect all the first ground terminals in series;

a second terminal group comprising a plurality of second conductive terminals, the plurality of second conductive terminals comprising a plurality of second signal terminals and a plurality of second ground terminals, each second conductive terminal comprising a flat second mating portion;

a second ground piece comprising a plurality of second abutting portions and a plurality of second protruding portions connected to the second abutting portions; wherein the second signal terminal is not in contact with a corresponding second protruding portion; the second abutting portions are in contact with corresponding second ground terminals to connect all the second ground terminals in series;

an insulating body comprising a tongue plate, the tongue plate comprising a first surface and a second surface opposite to the first surface, the first mating portions of the first conductive terminals being exposed on the first surface, the second mating portions of the second conductive terminals being exposed on the second surface;

a first insulating block, the plurality of first conductive terminals and the first ground piece being at least partially insert-molded in the first insulating block; and a second insulating block, the plurality of second conductive terminals and the second ground piece are at least partially insert-molded in the second insulating block;

wherein the first ground piece and the second ground piece are located between the first mating portions and the second mating portions along a thickness direction of the tongue plate;

the method comprising:

fixing the first ground piece to be in contact with the first ground terminals of the first terminal group to form a first module;

injection-molding the first insulating block on the first module to obtain a first terminal module;

fixing the second ground piece to be in contact with the second ground terminals of the second terminal group to form a second module;

injection-molding the second insulating block on the second module to obtain a second terminal module; and injection-molding an insulating material on the first terminal module and the second terminal module, so that the first terminal module and the second terminal module are combined into a whole.

18. The method according to claim 17, further comprising:

providing a plurality of first cables and a plurality of second cables;

connecting the first cables and the second cables to the corresponding first conductive terminals and the second conductive terminals, respectively; and injection-molding an insulating material on junctions of the first cables and the first conductive terminals and junctions of the second cables and the second conductive terminals so as to form an outer insulating block; wherein the outer insulating block is integrally formed with the first insulating block and the second insulating block.

* * * * *